(12) United States Patent
Lee et al.

(10) Patent No.: US 10,596,564 B2
(45) Date of Patent: Mar. 24, 2020

(54) CATALYST REGENERATOR, FLUID CATALYTIC CRACKING REACTION SYSTEM AND CATALYST REGENERATION METHOD

(71) Applicants: KOREA INSTITUTE OF MACHINERY & MATERIALS, Daejeon (KR); KOREA RESEARCH INSTITUTE OF CHEMICAL TECHNOLOGY, Daejeon (KR)

(72) Inventors: Dae-hoon Lee, Daejeon (KR); Kwan-Tae Kim, Daejeon (KR); Sungkwon Jo, Daejeon (KR); Yong-Ki Park, Daejeon (KR)

(73) Assignees: KOREA INSTITUTE OF MACHINERY & MATERIALS, Daejeon (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 16/336,040

(22) PCT Filed: Sep. 22, 2017

(86) PCT No.: PCT/KR2017/010434
§ 371 (c)(1),
(2) Date: Mar. 22, 2019

(87) PCT Pub. No.: WO2018/056735
PCT Pub. Date: Mar. 29, 2018

(65) Prior Publication Data
US 2019/0217284 A1 Jul. 18, 2019

(30) Foreign Application Priority Data
Sep. 22, 2016 (KR) .......................... 10-2016-0121753

(51) Int. Cl.
*B01J 8/08* (2006.01)
*B01J 8/12* (2006.01)
(Continued)

(52) U.S. Cl.
CPC ............... *B01J 38/04* (2013.01); *C10G 11/02* (2013.01); *C10G 11/18* (2013.01); *C10G 11/182* (2013.01);
(Continued)

(58) Field of Classification Search
CPC . B01J 8/00; B01J 8/08–087; B01J 8/12; B01J 8/125; B01J 8/18–1845; B01J 8/24;
(Continued)

(56) References Cited

U.S. PATENT DOCUMENTS 4,610,851 A * 9/1986 Colvert ................ C10G 11/182
239/288
6,579,820 B2 * 6/2003 Tamhankar ............ B01D 53/56
502/20
(Continued)

FOREIGN PATENT DOCUMENTS

JP 07-103436 A 4/1995
KR 10-1988-0005240 A 6/1988
(Continued)

OTHER PUBLICATIONS

International Search Report for PCT/KR2017/010434 dated Jan. 31, 2018, citing the above reference(s).

*Primary Examiner* — Natasha E Young
(74) *Attorney, Agent, or Firm* — Hauptman Ham, LLP (57) ABSTRACT

A catalyst regenerator includes: a container including a catalyst inlet through which a coked catalyst is introduced and a catalyst outlet to which a regenerated catalyst is discharged; a first supply unit formed below the catalyst inlet and supplying a syngas containing solid carbon to the coked
(Continued)

catalyst introduced into the container; and a second supply unit formed below the first supply unit and supplying high-temperature air into the container.

21 Claims, 9 Drawing Sheets

(51) Int. Cl.

| | | |
|---|---|---|
| *B01J 8/18* | (2006.01) | |
| *B01J 8/24* | (2006.01) | |
| *B01J 8/32* | (2006.01) | |
| *B01J 38/04* | (2006.01) | |
| *C10G 11/18* | (2006.01) | |
| *C10G 35/14* | (2006.01) | |
| *C10G 11/02* | (2006.01) | |

(52) U.S. Cl.
CPC ..... *C10G 35/14* (2013.01); *C10G 2300/4081* (2013.01)

(58) Field of Classification Search
CPC ..... B01J 8/32; B01J 19/00; B01J 19/24; B01J 38/04; B01J 2208/00743; B01J 2208/00752; B01J 2208/00796; B01J 2208/00805; B01J 2208/00893; B01J 2208/00902; B01J 2219/24; B01J 38/00; C10G 11/00; C10G 11/02; C10G 2300/40; C10G 2300/4081; C10G 11/14; C10G 11/18; C10G 11/182; C10G 35/00; C10G 35/04; C10G 35/10; C10G 35/14
See application file for complete search history.

(56) References Cited

U.S. PATENT DOCUMENTS

| | | | | |
|---|---|---|---|---|
| 6,632,765 | B1* | 10/2003 | Chen | ........................ B01J 23/92 |
| | | | | 502/53 |
| 2014/0221707 | A1* | 8/2014 | Bories | ...................... B01J 38/30 |
| | | | | 585/240 |
| 2014/0357912 | A1* | 12/2014 | Mandal | ................ C10G 11/182 |
| | | | | 585/302 |

FOREIGN PATENT DOCUMENTS

| | | |
|---|---|---|
| KR | 10-0247678 B1 | 3/2000 |
| KR | 10-2014-0140542 A | 12/2014 |
| KR | 10-2016-0030456 A | 3/2016 |

\* cited by examiner

CATALYST REGENERATOR, FLUID CATALYTIC CRACKING REACTION SYSTEM AND CATALYST REGENERATION METHOD

The instant specification is a national stage application of PCT/KR2017/010434 filed on Sep. 22, 2017, which claims priority from KR 10-2016-0121753 filed on Sep. 22, 2016. Both of the priority documents are hereby incorporated hereby in the entireties by reference.

TECHNICAL FIELD

The present invention relates to a catalyst regenerator, a fluid catalytic cracking reaction system, and a catalyst regeneration method. More particularly, the present invention relates to a catalyst regenerator, a fluid catalytic cracking reaction system, and a catalyst regeneration method of to continuously regenerating a coked catalyst in an oil refining process of separating various kinds of oil from petroleum and a process of producing olefin from naphtha.

BACKGROUND ART

Generally, ethylene is a representative material of a basic raw material in a petrochemical field. In a petrochemical process, various materials are produced through various processes based on olefin compounds such as ethylene and propylene.

The olefin is obtained by cracking naphtha or is obtained from ethane. In Korea, the olefin compound such as the ethylene has been mainly produced using the naphtha as a raw material.

In a method of producing the olefin from the naphtha, conventionally, a process was performed at a high temperature of 1000° C. or more using naphtha cracking center (NCC).

Recently, a process of producing the olefin from the naphtha at a lower temperature of about 700° C. using a catalyst has been commercialized.

In a process of using the catalyst, the naphtha is supplied together with steam to a lower end of a riser and a regenerated catalyst pushed out from a catalyst regenerator is again supplied to the lower end of the riser, the naphtha and the catalyst are mixed with each other, and the olefin is produced by cracking the naphtha while allowing the naphtha to rise along the riser. The catalyst is coked while cracking the naphtha in the riser. That is, carbon to particles cover a surface of the catalyst.

The riser is connected to a cyclone provided at an upper portion of the catalyst regenerator. Therefore, a produced olefin gas is separated in the cyclone, exits from a stripper vessel, and is transmitted to a main column of a fluid catalytic cracking (FCC), and the coked catalyst is separated in the cyclone, and falls down. A fuel gas is supplied to a waste heat boiler.

In addition, the catalyst is also used in the conventional naphtha cracking center. In this case, the naphtha generates a significantly large amount of coke of about 7% of a weight of the catalyst while being cracked at a high temperature. That is, carbon particles cover a surface of the catalyst. The caked catalyst should be regenerated, be again transmitted to the riser, be mixed with the naphtha, and be used for a naphtha cracking reaction. However, when the catalyst is coked, it is difficult to smoothly generate the naphtha cracking reaction. Therefore, the coked catalyst falling to the bottom of the catalyst regenerator is regenerated. That is, the regeneration is to burn away the coke attached to the catalyst.

In the case in which an amount of used catalyst is large, the catalyst forms a fluidized bed type having a high density. That is, the catalyst is accumulated in an inner portion of a central wall provided at a lower end of a stand pipe inducing the catalyst. In order to prevent such a phenomenon, high-temperature air and stream are sprayed from a lower side of the inner portion of the center wall toward the falling catalyst, together with a fuel for regenerating the catalyst. The high-temperature air and stream spraying upward help to regenerate the catalyst and prevent a rise of a density in the catalyst fluidized bed type.

Such a catalyst regenerator is not appropriate for being applied to a catalyst regenerator in which an amount of used catalyst is small. That is, the catalyst regenerator regenerating a catalyst used in a large amount includes the stand pipe and the center wall, and requires components for supplying the high-temperature air and stream to the inner portion of the center wall.

DISCLOSURE

Technical Problem

The present invention has been made in an effort to provide a catalyst regenerator, fluid catalytic cracking reaction system, and a catalyst regeneration method having advantages of continuously regenerating a coked catalyst in a simple configuration in the case in which an amount of used catalyst is small in an oil refining process of separating various kinds of oil from petroleum and a process of producing olefin from naphtha.

Technical Solution

An exemplary embodiment of the present invention provides a catalyst regenerator including: a container including a catalyst inlet through which a coked catalyst is introduced and a catalyst outlet to which a regenerated catalyst is discharged; a first supply unit formed below the catalyst inlet and supplying a syngas containing solid carbon to the coked catalyst introduced into the container; and a second supply unit formed below the first supply unit and supplying high-temperature air into the container.

The catalyst inlet may be disposed at an upper portion of the container, and the catalyst outlet may be disposed at a lower portion of the container.

The first supply unit may include a first nozzle assembly supplying the syngas, and the second supply unit may include a second nozzle assembly supplying the high-temperature air.

The second nozzle assembly may be spaced apart from the first nozzle assembly by a first distance and may be spaced apart from the catalyst outlet by a second distance, and the first distance may be set to a product of a flow velocity of the coked catalyst and a time at which the coked catalyst and the high-temperature syngas are mixed with each other.

The container may set a coking volume depending on the first distance, and the coking volume may be set to a size at which the coked catalyst is additionally coked by the syngas.

The second distance may be set to a product of a flow velocity of the additionally coked catalyst and a time at which the additionally coked catalyst is combusted by the syngas.

The container may set a combustion volume depending on the second distance, and the combustion volume may be set to a size at which the additionally coked catalyst is combusted by the high-temperature air.

The first nozzle assembly may include: a first doughnut pipe corresponding to a horizontal cross-sectional shape of a cylinder of the container; and a first supply pipe installed in the container and connected to the first doughnut pipe to supply the syngas, and the first doughnut pipe may include a first mixed gas nozzle and a second mixed gas nozzle forming spraying directions at angles set to be 90° or less with respect to a base line penetrating through a center in a vertical direction in a circular cross section of the first doughnut pipe in the vertical direction.

The second nozzle assembly may include: a second doughnut pipe corresponding to a horizontal cross-sectional shape of a cylinder of the container; and a second supply pipe installed in the container and connected to the second doughnut pipe to supply the high-temperature air, and the second doughnut pipe may include a first air nozzle and a second air nozzle forming spraying directions at angles set to be 90° or less with respect to a base line penetrating through a center in a vertical direction in a circular cross section of the second doughnut pipe in the vertical direction.

The first supply unit may be connected to a plasma burner forming a rotation arc to produce the syngas by a partial oxidation reaction.

At least one of the first supply unit and the second supply unit may include a supply pipe connected to one side of an outer circumference of the container.

At least one of the first supply unit and the second supply unit may include: a supply chamber formed along an outer circumference of the container at the outer circumference and connected to a supply port formed in the container; and a supply pipe externally connected to the supply chamber.

The catalyst inlet may be disposed at an upper portion of the container, and the catalyst outlet may be disposed at a side portion of the container.

The catalyst inlet may include a plurality of catalyst pipes disposed to be elongated downward in the container and guiding the introduction of the coked catalyst, and the catalyst outlet may be formed at a position higher than a lower end of the catalyst pipe.

The first supply unit may be formed at the side portion of the container at a position lower than the lower end of the catalyst pipe, and the second supply unit may be formed at a lower portion of the container at a position lower than the first supply unit.

Another exemplary embodiment of the present invention provides a fluid catalytic cracking reaction system including: a reacting unit generating a cracking reaction by mixing a catalyst with petroleum or naphtha; a separating unit separating a reaction product generated in the reacting unit from the catalyst depending on a property and a feature; and the catalyst regenerator described above regenerating the coked catalyst introduced from the separating unit and supplying the regenerated catalyst to the reacting unit.

Yet another exemplary embodiment of the present invention provides a catalyst regeneration method including: a catalyst supplying step of supplying a coked catalyst; an additional coking step of additionally coking the coked catalyst by a high-temperature syngas; a regenerating step of regenerating the additionally coked catalyst; and a discharging step of discharging the regenerated catalyst.

In the catalyst supplying step, the coked catalyst may be supplied from a fluid catalytic cracking (FCC) reaction system.

In the additional coking step, the high-temperature syngas containing solid carbon may be supplied to the coked catalyst to additionally coke the coked catalyst.

In the regenerating step, high-temperature air may be supplied to regenerate the additional coked catalyst.

The coked catalyst supplied in the catalyst supplying step may pass through the additional coking step, the regenerating step, and the discharging step while moving from an upper portion of a container to a lower portion of the container.

Advantageous Effects

According to an exemplary embodiment of the present invention, first and second supply units (first and second nozzle assemblies) are sequentially provided inside a container, such that in a fluid catalytic cracking (FCC) reaction system, a high-temperature syngas containing solid carbon and high-temperature air may be sequentially supplied to a coked catalyst to additionally coke the coked catalyst and regenerate the additionally coked catalyst.

MODE FOR INVENTION

Hereinafter, exemplary embodiments of the present invention will be described in detail with reference to the accompanying drawings so that those skilled in the art to which the present invention pertains may easily practice the present invention. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, since sizes and thicknesses of the respective components illustrated in the drawings are arbitrarily illustrated for convenience of explanation, the present invention is not necessarily limited to those illustrated in the drawings.

Throughout the present specification, when any one portion is referred to as being "connected to" another portion, it means that any one portion and another portion are "directly connected to" each other or are "indirectly connected to" each other with the other portion interposed therebetween. In addition, unless explicitly described to the contrary, the word "comprise" and variations such as "comprises" or "comprising", will be understood to imply the inclusion of stated elements but not the exclusion of any other elements.

Throughout the present specification, it will be understood that when a portion such as a layer, a film, a region, or a substrate is referred to as being "on" another portion, it may be directly on another element or may have an intervening portion present therebetween. In addition, the word "on (on an upper surface)" does not necessarily mean that any element is positioned at an upper side based on a gravity direction, but means that any element is positioned above or below a target portion.

For example, in a process of producing a reaction product (for example, olefin) by cracking a target material (for example, naphtha) using a catalyst, a reaction unit mixes an over-heated target material (for example, naphtha) injected together with steam and a high-temperature catalyst with each other to generate a cracking reaction of the target material (for example, naphtha). The target material (for example, naphtha) is cracked by continuously reacting to the catalyst while rising along the reaction unit.

A separating unit (for example, a cyclone) separates a coked catalyst transmitted from the reaction unit and a generated reaction product (for example, olefin) from each other. The separated reaction product (for example, olefin) is transmitted from a fluid catalytic cracking (FCC) reaction system to a main column (not illustrated) of an FCC, and the coked catalyst falls to and is regenerated in a catalyst regenerator.

Figure 1:
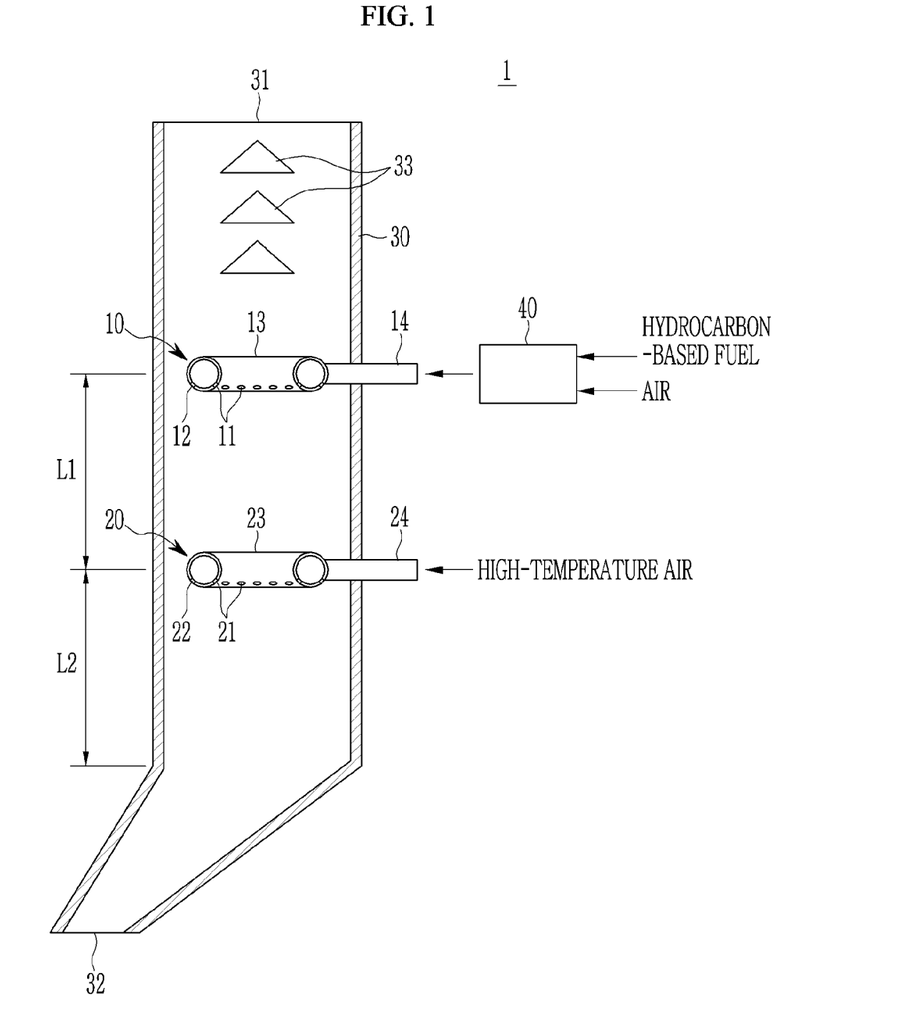
FIG. 1 is a cross-sectional view of a catalyst regenerator according to a first exemplary embodiment of the present invention.

FIG. 1 is a cross-sectional view of a catalyst regenerator according to a first exemplary embodiment of the present invention. For convenience, in FIG. 1, a case of cracking naphtha and then regenerating a coked catalyst will be described by way of example. A catalyst regenerator 1 is configured to supply carbon or carbon and gaseous hydrocarbon (HC) to a gaseous fluid to deposit the carbon or the carbon and the gaseous HC on a catalyst or coke the carbon or the carbon and the gaseous HC, and separately supply an oxidizing agent (combustion air) to combust the coked carbon, thereby compensating for a temperature of the fluid reduced in a cracking reaction process and regenerating the catalyst.

Referring to FIG. 1, a catalyst regenerator 1 according to a first exemplary embodiment is configured to regenerate a coked catalyst introduced after a cracking reaction of naphtha, and includes a container 30 in which the coked catalyst flows, and a first supply unit (as an example, a first nozzle assembly) 10 and a second supply unit (as an example, a second nozzle assembly) 20 that are installed in the container 30.

The container 30 includes a catalyst inlet 31 formed at an upper portion thereof and a catalyst outlet 32 formed at a lower portion thereof. As an example, the container 30 may be formed of a cylindrical body. The coked catalyst generated by the cracking reaction of the naphtha in a riser is introduced into the upper portion of the container 30 through the catalyst inlet 31, falls to the lower portion of the container 30 in the container 30, is regenerated, and is then discharged to the catalyst outlet 32.

The container 30 includes distributors 33 formed at the upper portion thereof through the catalyst inlet 31. The distributors 33 uniformly distribute the coked catalyst introduced through the catalyst inlet 31 and falling from the upper portion of the container 30 to the lower portion of the container 30 with respect to a cross-sectional area of the container 30 in a horizontal direction. Therefore, the coked catalyst passing through the distributors 33 may fall in a uniform distribution in the horizontal direction toward the first supply unit, that is, the first nozzle assembly 10.

That is, for the purpose of continuous flow of the coked catalyst in the container 30, the first nozzle assembly 10 is installed below the catalyst inlet 31 and the distributors 33, and the second nozzle assembly 20 is installed below the first nozzle assembly 10. The catalyst outlet 32 is provided below the second nozzle assembly 20.

The first nozzle assembly 10 sprays and supplies a high-temperature syngas containing solid carbon to the coked catalyst. That is, the first nozzle assembly 10 may supply carbon or carbon and HC through partial oxidation of a fuel. The second nozzle assembly 20 supplies high-temperature air to a mixture of a coked catalyst additionally coked while passing through the first nozzle assembly 10 and the high-temperature syngas.

The first nozzle assembly 10 and the second nozzle assembly 20 are spaced apart from each other by a first distance L1. The first distance L1 is set to be equal to or greater than a distance at which the coked catalyst passing through the first nozzle assembly 10 and the high-temperature syngas sprayed from the first nozzle assembly 10 are sufficiently mixed with each other. For example, the first distance L1 may be set to be equal to or greater than a product of a flow velocity Vc of the coked catalyst and a time Tm at which the coked catalyst and the high-temperature syngas may be mixed with each other.

The container 30 sets a coking volume depending on the first distance L1. The coking volume in the container 30 is set in a flow direction of the coked catalyst, and is set to a size at which the coked catalyst may be additionally coked by the high-temperature syngas supplied from the first nozzle assembly 10.

The second nozzle assembly 20 and the catalyst outlet 32 are spaced apart from each other by a second distance L2. The second distance L2 is set to be equal to or greater than a distance at which the additionally coked catalyst passing through the first distance L1 is sufficiently combusted by the high-temperature air sprayed from the second nozzle assembly 20. For example, the second distance L2 is set to be equal to or greater than a product of a flow velocity Vcc of the additionally coked catalyst and a time Tb at which the additionally coked catalyst may be combusted by the syngas.

The container 30 sets a combustion volume depending on the second distance L2. The combustion volume in the container 30 is set to a size at which the additionally coked catalyst may be combusted by the high-temperature air, and is set to a size at which the additionally coked catalyst may be combusted by the high-temperature air supplied from the second nozzle assembly 20.

Figure 2:
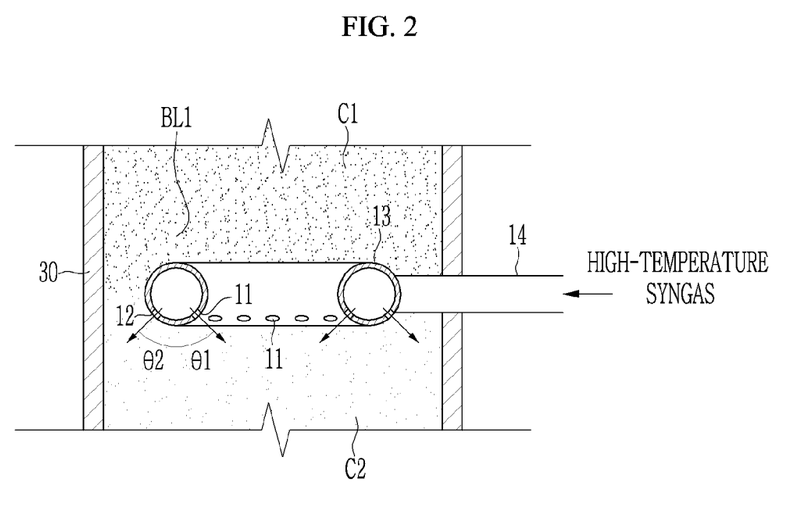
FIG. 2 is a view illustrating an operation state of supplying a high-temperature syngas containing solid carbon from a first nozzle assembly used in FIG. 1 to a coked catalyst.
Figure 3:
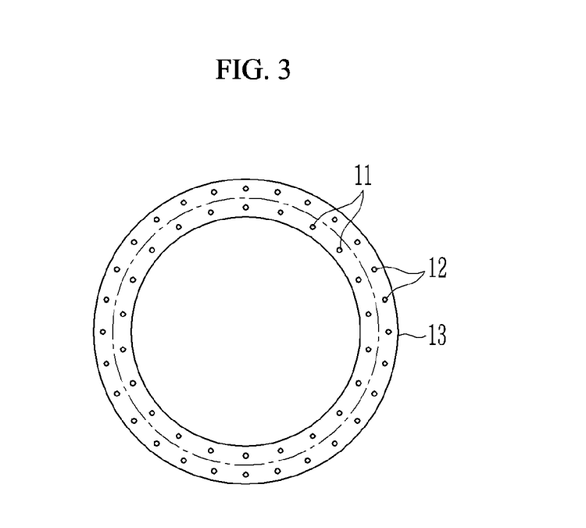
FIG. 3 is a bottom view of the first nozzle assembly illustrated in FIG. 2.

FIG. 2 is a view illustrating an operation state of supplying a high-temperature syngas containing solid carbon from a first nozzle assembly used in FIG. 1 to a coked catalyst, and FIG. 3 is a bottom view of the first nozzle assembly illustrated in FIG. 2.

Referring to FIGS. 1 to 3, the first nozzle assembly 10 is disposed at an upper portion of an inner side of the container 30, and is configured to supply a high-temperature syngas containing solid carbon to the coked catalyst C1 introduced from the catalyst inlet 31 and then falling.

The first nozzle assembly 10 is connected to a partial oxidation burner 40. The partial oxidation burner 40 is configured to produce a high-temperature gas containing solid carbon, that is, a syngas (partial oxidation product)

As an example, the partial oxidation burner 40 may be a plasma burner partially oxidizing hydrocarbon-based fuel oil. Although not illustrated, the plasma burner includes an electrode to which a high voltage is applied, a ground electrode forming a discharge gap together with the electrode to which the high voltage is applied, and an oxidizing agent supply unit and a fuel supply unit (for example, a nozzle) supplying, respectively, a oxidizing agent (air) and a fuel to a space between the electrode to which the high voltage is applied and the ground electrode so as to generate discharge. In addition, the plasma burner may allow the oxidizing agent (air) to be supplied in a rotation direction to form a rotation arc.

Generally, in a complete oxidation reaction that completely combusts a hydrocarbon-based fuel, water and carbon dioxide are produced. However, when an oxygen amount more insufficient than that in complete combustion is supplied, a partial oxidation reaction that incompletely combusts a hydrocarbon-based fuel occurs.

Even though being changed depending on an air fuel ratio, hydrogen, carbon monoxide, hydrocarbon of which the number of carbon atoms is small, solid carbon, carbon dioxide, water, and the like, are produced in the partial oxidation reaction. As described above, the partial oxidation burner 40 products the high-temperature syngas containing the solid carbon by a plasma reaction, by the hydrocarbon-based fuel and the air supplied thereto.

A general burner may implement partial oxidation in a very limited inflammable range of the air fuel ratio. However, in the case in which the general burner is used as the partial oxidation burner, the partial oxidation burner may produce and supply the solid carbon within only the limited inflammable range (that is, only in the case in which a temperature is comparatively high).

On the other hand, in the case in which the plasma burner is used as the partial oxidation burner 40, the partial oxidation burner 40 may produce and supply the solid carbon within a very wide inflammable range of the air fuel ratio. In addition, the partial oxidation burner 40 may continuously maintain the partial oxidation reaction while controlling an amount of the generated solid carbon.

That is, in partial oxidation in which the air fuel ratio is low, large amounts of hydrogen and solid carbon are produced, and in partial oxidation in which the air fuel ratio becomes high (partial oxidation close to complete combustion), small amounts of hydrogen and solid carbon are produced while a temperature rises.

In the case in which the air fuel ratio rises in a section in which the air fuel ratio is generally low, a temperature of a syngas, that is, a partial oxidation product, produced in and discharged from the partial oxidation burner 40 rises, and in the case in which the air fuel ratio rises after the highest temperature, a temperature of the syngas produced in and supplied from the partial oxidation burner 40 falls.

The first nozzle assembly 10 includes a first doughnut pipe 13, a first supply pipe 14, first mixed gas nozzles 11, and second mixed gas nozzles 12. The first doughnut pipe 13 is disposed in the container 30 having a cylindrical shape, and is formed to correspond to a horizontal cross-sectional shape.

The first supply pipe 14 may be connected to the partial oxidation burner 40, be installed to penetrate through a wall of the container 30, and have an end portion of an inner side to which the first doughnut pipe 13 is connected, thereby supplying the high-temperature syngas containing the solid carbon, produced by the partial oxidation into the first doughnut pipe 13 and the container 30.

The first doughnut pipe 13 includes the first and second mixed gas nozzles 11 and 12 spraying a mixed gas. The first and second mixed gas nozzles 11 and 12 form spraying directions at angles $\theta 1$ and $\theta 2$ set inward or outward with respect to a base line BL1 of the first doughnut pipe 13 in a vertical direction. The base line BL1 is set to penetrate through the center in the vertical direction in a cross section of the first doughnut pipe 13 in the vertical direction, that is, in a circular cross section.

The first and second mixed gas nozzles 11 and 12 spray the high-temperature syngas containing the solid carbon, supplied from the partial oxidation burner 40 through the first supply pipe 14 and the first doughnut pipe 13, at the angles $\theta 1$ and $\theta 2$ set in inward and outward directions of the first doughnut pipe 13. The angles $\theta 1$ and $\theta 2$ are set to 90° or less with respect to the base line BL1. That is, the angles $\theta 1$ and $\theta 2$ prevent the high-temperature syngas from being sprayed upward in the container 30.

The first and second mixed gas nozzles 11 and 12 are installed, respectively, inside and outside a central line in a bottom surface of the first doughnut pipe 13 and uniformly spray the syngas into the container 30. Therefore, the first and second mixed gas nozzles 11 and 12 may uniformly spray the high-temperature syngas to the falling coked catalyst C1 at the angles $\theta 1$ and $\theta 2$ set inward and outward at a lower portion of the first doughnut pipe 13.

The sprayed high-temperature syngas is mixed with the coked catalyst C1 falling from the catalyst inlet 31, and the coked catalyst C1 is additionally coked while passing through the first distance L1 between the first and second nozzle assemblies 10 and 20. That is, the catalyst passing through the first distance L1 and then falling to the second nozzle assembly 20 is a catalyst C2 additionally coked by the high-temperature syngas containing the solid carbon.

Figure 4:
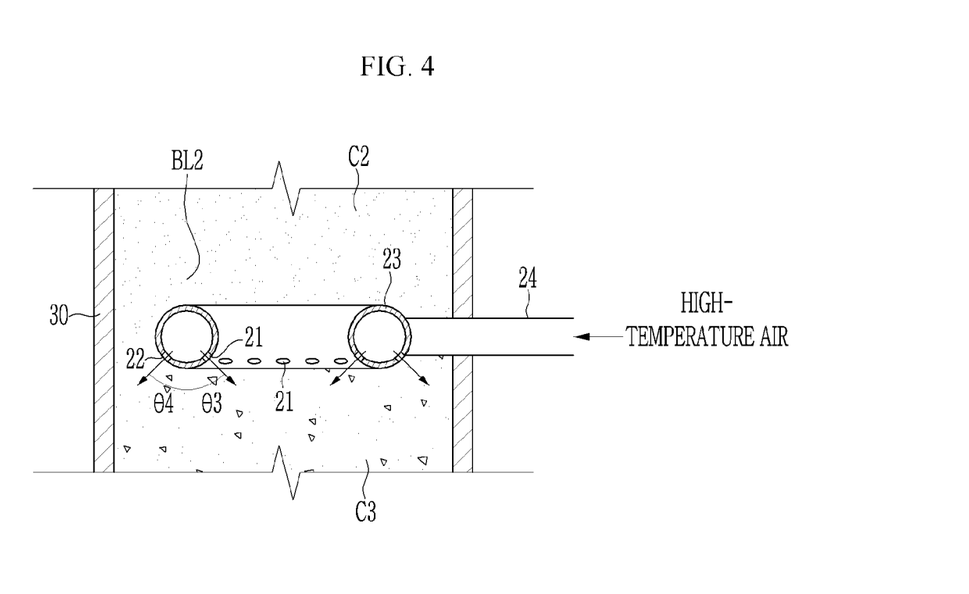
FIG. 4 is a view illustrating an operation state of supplying high-temperature air from a second nozzle assembly used in FIG. 1 to a mixture of a high-temperature syngas and a coked catalyst formed at a lower side of the first to nozzle assembly.

The second nozzle assembly 20 includes a second doughnut pipe 23, a second supply pipe 24, first air nozzles 21, and second air nozzles 22. The second doughnut pipe 23 is disposed in the container 30 having the cylindrical shape, and is formed to correspond to a horizontal cross-sectional shape.

The second supply pipe 24 may be installed to penetrate through a wall of the container 30 and have an end portion of an inner side to which the second doughnut pipe 23 is connected, thereby supplying high-temperature air into the second doughnut pipe 23 and the container 30.

The second doughnut pipe 23 includes the first and second air nozzles 21 an 22 spraying the high-temperature air. The first and second air nozzles 21 and 22 form spraying directions at angles $\theta 3$ and $\theta 4$ set inward or outward with respect to a base line BL2 of the second doughnut pipe 23 in a vertical direction. The base line BL2 is set to penetrate through the center in the vertical direction in a cross section of the second doughnut pipe 23 in the vertical direction, that is, in a circular cross section.

The first and second air nozzles 21 and 22 spray the high-temperature air supplied through the second supply pipe 24 and the second doughnut pipe 23 at the angles $\theta 3$ and θ4 set in inward and outward directions of the second doughnut pipe 23. The angles θ3 and θ4 are set to 90° or less with respect to the base line BL2. That is, the angles θ3 and θ4 prevent the high-temperature air from being sprayed upward in the container 30.

The first and second air nozzles 21 and 22 are installed, respectively, inside and outside a central line in a bottom surface of the second doughnut pipe 23 and uniformly spray the high-temperature air into the container 30. Therefore, the first and second air nozzles 21 and 22 may uniformly spray the high-temperature air to the additionally coked catalyst C2 additionally coked and then falling, at the angles θ3 and θ4 set inward and outward at a lower portion of the second doughnut pipe 23.

The sprayed high-temperature air is mixed with the additionally coked catalyst C2 passing through the first nozzle assembly 10 and the first distance L1 and then falling, and the additionally coked catalyst C2 is regenerated by the high-temperature air while passing through the second distance L2 between the second nozzle assembly 20 and the catalyst outlet 32. That is, coke attached to the additionally coked catalyst C2 is combusted by the high-temperature air while passing through the second distance L2.

A catalyst C3 regenerated through a region of the second distance L2 of the container 30 is discharged to the catalyst outlet 32 of the container 30, is again supplied to the riser connected to the catalyst outlet 32, and is mixed with naphtha to be used in a cracking reaction of the naphtha.

Hereinafter, various exemplary embodiments of the present invention will be described. A description for the same components as those of the first exemplary embodiment and the exemplary embodiment described above will be omitted, and components different from those of the first exemplary embodiment and the exemplary embodiment described above will be described.

Figure 5:
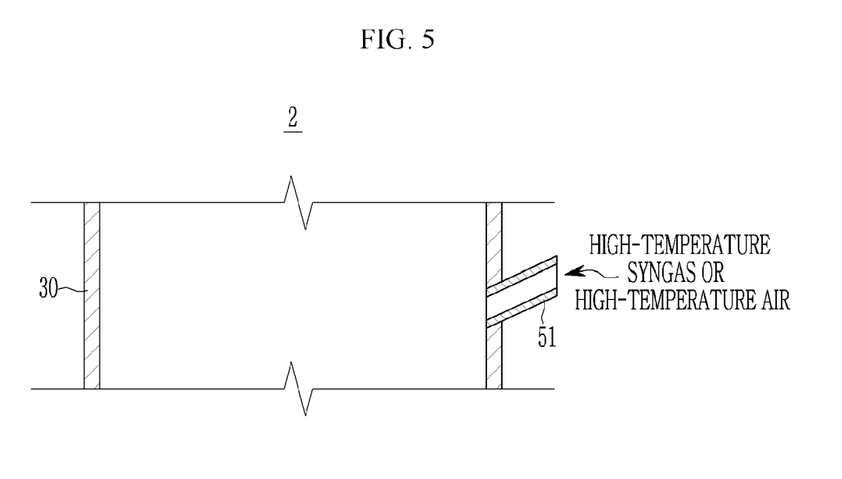
FIG. 5 is a cross-sectional view of first and second supply units used in a catalyst regenerator according to a second exemplary embodiment of the present invention.

FIG. 5 is a cross-sectional view of first and second supply units used in a catalyst regenerator according to a second exemplary embodiment of the present invention. Referring to FIG. 5, in a catalyst regenerator 2 according to a second exemplary embodiment, at least one of the first supply unit and the to second supply unit is formed of a supply pipe 51 connected to one side of an outer circumference of the container 30.

The supply pipe 51 may be directly connected to the outer circumference of the container 30 to be used in the first supply unit and the second supply unit. In the case in which the supply pipe is used as the first supply unit, the supply pipe 51 supplies the syngas containing the solid carbon into the container 30 to additionally coke the coked catalyst. In the case in which the supply pipe is used as the second supply unit, the supply pipe 51 supplies the high-temperature air into the container 30 to regenerate the additionally coked catalyst. The supply pipe 51 simplifies a supply structure of the syngas and the high-temperature air.

Figure 6:
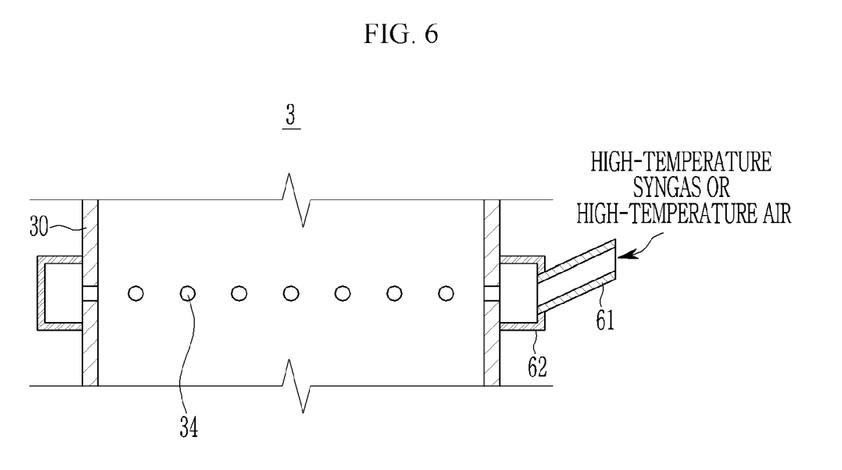
FIG. 6 is a cross-sectional view of first and second supply units used in a catalyst regenerator according to a third exemplary embodiment of the present invention.

FIG. 6 is a cross-sectional view of first and second supply units used in a catalyst regenerator according to a third exemplary embodiment of the present invention. Referring to FIG. 6, in a catalyst regenerator 3 according to a third exemplary embodiment, at least one of the first supply unit and the second supply unit includes a supply chamber 62 and a supply pipe 61.

The supply chamber 62 is formed along an outer circumference of the container 30 at the outer circumference, and is connected to supply ports 34 formed in the container 30. The supply pipe 61 is externally connected to the supply chamber 62. The supply pipe 61 and the supply chamber 62 may be connected to the outer circumference of the container 30 to be used in the first supply unit and the second supply unit.

In the case in which the supply pipe and the supply chamber are used as the first supply unit, the supply pipe 61, the supply chamber 62, and the to supply ports 34 supply the syngas containing the solid carbon into the container 30 to additionally coke the coked catalyst. In the case in which the supply pipe and the supply chamber are used as the second supply unit, the supply pipe 61, the supply chamber 62, and the supply ports 34 supply the high-temperature air into the container 30 to regenerate the additionally coked catalyst. The supply chamber 62 and the supply pipe 61 allow the syngas and the high-temperature air to be uniformly supplied in a circumferential direction of the container 30.

Figure 7:
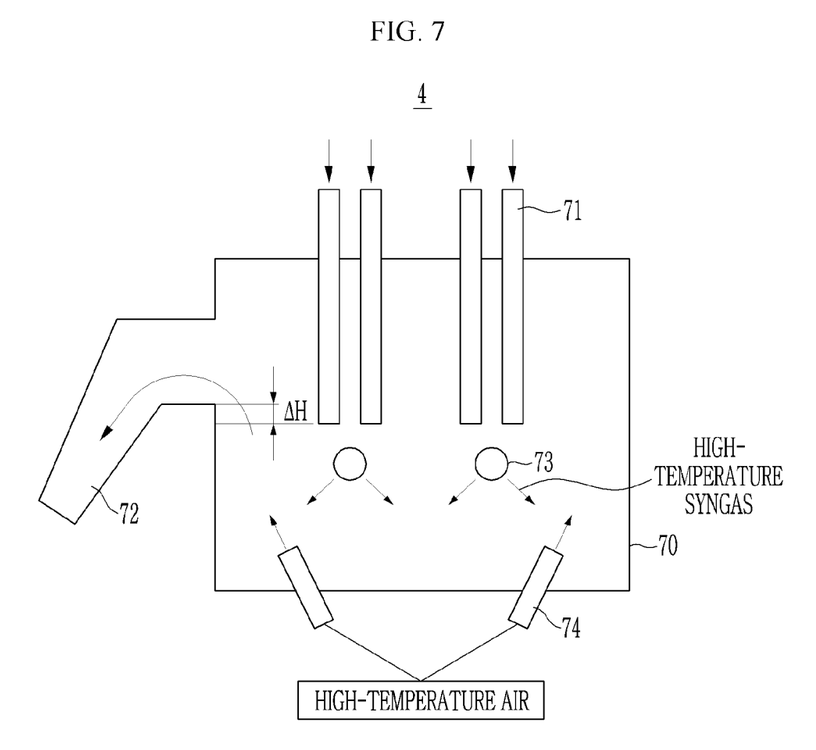
FIG. 7 is a cross-sectional view of a catalyst regenerator according to a fourth exemplary embodiment of the present invention.

FIG. 7 is a cross-sectional view of a catalyst regenerator according to a fourth exemplary embodiment of the present invention. Referring to FIG. 7, in a catalyst regenerator 4 according to a fourth exemplary embodiment, a container 70 includes a catalyst inlet 71 introducing a coked catalyst and a catalyst outlet 72 discharging a regenerated catalyst. First supply units 73 supply a syngas containing solid carbon to the coked catalyst introduced into the catalyst inlet 71. Second supply units 74 supply high-temperature air into the container 70.

The catalyst inlet 71 may be provided at an upper portion of the container 70, and the catalyst outlet 72 may be provided at a lower portion or a side portion of the container 70. For convenience, in FIG. 7, the catalyst outlet 72 is provided at the side portion of the container 70.

As an example, the catalyst inlet 71 includes a plurality of catalyst pipes 71 disposed to be elongated downward in the container 70 and guiding the introduction of the coked catalyst. In this case, the catalyst outlet 72 is formed at the side portion of the container 70 at a position ΔH higher than a lower end of the catalyst pipe 71. Therefore, a height difference ΔH prevents the coked catalyst from being discharged to the catalyst outlet 72 in a state in which the coked catalyst is not regenerated in the container 70.

The first supply units 73 are formed at a side portion of the container 70 at a position lower than a lower end of the catalyst pipe 71, and supply the high-temperature syngas containing solid carbon into the container 70 to additionally coke the coked catalyst. The second supply units 74 are formed at a lower portion of the container 70 at a position lower than the first supply units 73 and supply the high-temperature air to regenerate the additionally coked catalyst.

Figure 8:
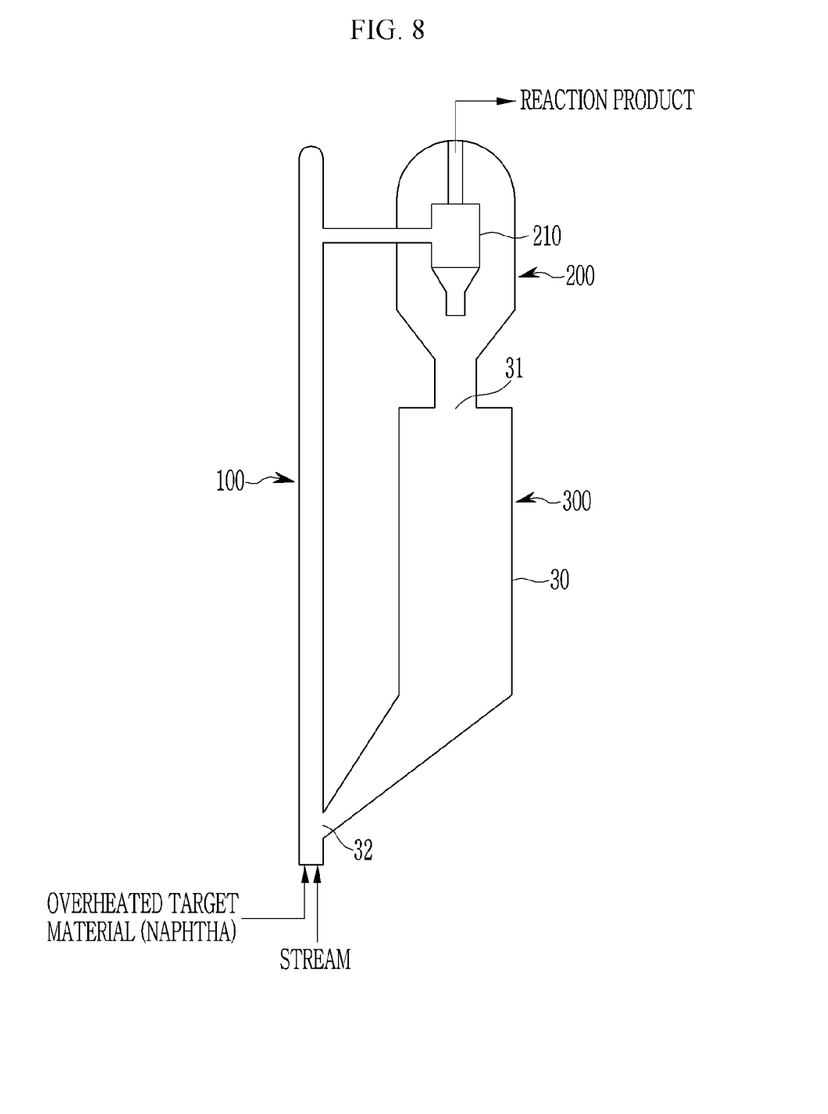
FIG. 8 is a configuration diagram illustrating a fluid catalytic cracking reaction system according to an exemplary embodiment of the present invention.

FIG. 8 is a configuration diagram illustrating a fluid catalytic cracking reaction system according to an exemplary embodiment of the present invention. Referring to FIG. 8, a fluid catalytic cracking (FCC) reaction system according to an exemplary embodiment of the present invention includes a reacting unit 100, a separating unit 200, and a catalyst regenerator 300.

The reaction unit 100 mixes a catalyst with a supplied target material (for example, naphtha) to generate a crack reaction, thereby producing a reaction product (for example, olefin). As an example, the reacting unit 100 performs an oil refining process of separating various kinds of oil from petroleum, a process of producing the olefin from the naphtha, propane dehydrogenation (PDH), or the like.

The separating unit 200 separates the reaction product produced in the reacting unit 100 from a catalyst coked in a cracking reaction process depending on a property and a feature. For example, the separating unit 200 may include a separating device (not illustrated) and a cyclone 210 to separate the reaction product and the coked catalyst from each other after a cracking to reaction. The reaction product is supplied to the next process, and the coked catalyst is supplied to the catalyst regenerator 300 disposed below the separating unit.

The catalyst regenerator 300 is configured as described above with reference to FIGS. 1 to 4, regenerates the coked catalyst introduced from the separating unit 200 into the catalyst inlet 31, and again supplies the regenerated catalyst to the reacting unit 100 through the catalyst outlet 32. To this end, the catalyst inlet 31 of the catalyst regenerator 300 is connected to the separating unit 200, and the catalyst outlet 32 of the catalyst regenerator 300 is connected to the reacting unit 100.

Figure 9:
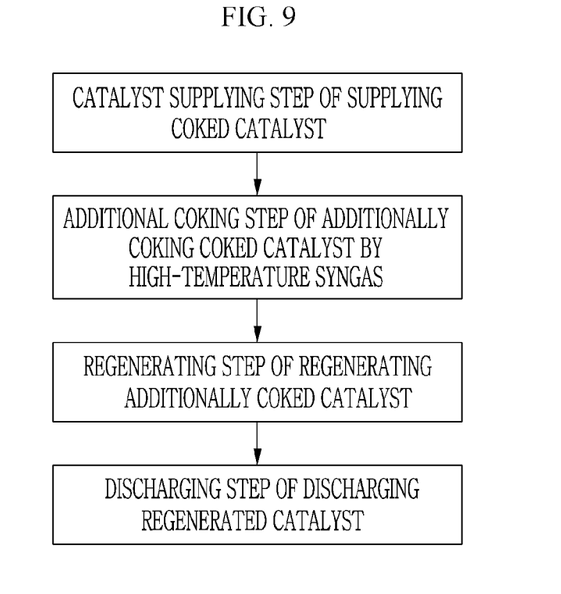
FIG. 9 is a flowchart illustrating a catalyst regeneration method according to an exemplary embodiment of the present invention.

FIG. 9 is a flowchart illustrating a catalyst regeneration method according to an exemplary embodiment of the present invention. A catalyst regeneration method will be described with reference to FIG. 9. The catalyst regeneration method according to an exemplary embodiment includes a catalyst supplying step ST1 of supplying a coked catalyst, an additional coking step ST2 of additionally coking the coked catalyst by a high-temperature syngas, a regenerating step ST3 of regenerating the additionally coked catalyst, and a discharging step ST4 of discharging the regenerated catalyst.

That is, the coked catalyst supplied in the catalyst supplying step is additionally coked in the additional coking step while moving from an upper portion of the catalyst regenerator 300 to a lower portion of the catalyst regenerator 300, is regenerated in the regenerating step, and is then discharged in the discharging step.

In the catalyst supplying step ST1, the coked catalyst is supplied from to the fluid catalytic cracking (FCC) reaction system to the container 30 of the catalyst regenerator 300. In the catalyst supplying step ST1, the coked catalyst is supplied to the catalyst inlet 31 provided at an upper portion of the container 30.

In the additional coking step ST2, the high-temperature syngas containing the solid carbon is supplied to the coked catalyst in the container 30 by the first nozzle assembly 10 to additionally coke the coked catalyst. In the regenerating step ST3, the high-temperature air is supplied by the second nozzle assembly 20 to regenerate the additional coked catalyst.

In the discharging step ST4, the additionally coked catalyst is discharged through the catalyst outlet 32 provided at the lower portion of the container 30. The additionally coked catalyst is again supplied to the reacting unit 100 to perform a catalyst action.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The scope of the present invention is not limited to the abovementioned exemplary embodiment and a modified example, but may be implemented in various forms that fall within the claims. The present invention may be variously modified by those skilled in the art to which the present invention pertains without departing from the scope of the present invention as defined by the claims. In addition, these modifications are to fall within the scope of the following claims.

<Description of symbols>

| | |
|---|---|
| 1, 2, 3, 4, 300: catalyst regenerator | 10: first nozzle assembly |
| 11: first mixed gas nozzle | 12: second mixed gas nozzle |
| 13, 23: first, second doughnut pipe | 14, 24: first, second supply pipe |
| 20: second nozzle assembly | 21, 22: first, second air nozzle |
| 30, 70: container | 31: catalyst inlet |
| 32, 72: catalyst outlet | 33: distributor |
| 34: supply port | 40: partial oxidation burner |
| 51, 61: supply pipe | 62: supply chamber |
| 71: catalyst inlet (catalyst pipe) | 73, 74: first, second supply unit |
| 100: reacting unit | 200: separating unit |
| BL1: base line | BL2: base line |
| C1: coked catalyst | C2: additionally coked catalyst |
| C3: regenerated catalyst | L1, L2: first, second distance |
| Tb: time at which catalyst may be combusted | |
| Tm: time at which coked catalyst and high-temperature syngas may be mixed with each other | |
| Vc, Vcc: flow velocity | $\theta 1, \theta 2, \theta 3, \theta 4$: angle |

The invention claimed is:

1. A catalyst regenerator comprising:
a container including a catalyst inlet through which a coked catalyst is introduced and a catalyst outlet to which a regenerated catalyst is discharged;
a first supply unit formed below the catalyst inlet and supplying a syngas containing solid carbon to the coked catalyst introduced into the container; and
a second supply unit formed below the first supply unit and supplying high-temperature air into the container, wherein
the catalyst inlet is disposed at an upper portion of the container and the catalyst outlet is disposed at a lower portion of the container,
the first supply unit includes a first nozzle assembly supplying the syngas, and
the second supply unit includes a second nozzle assembly supplying the high-temperature air,
the second nozzle assembly is spaced apart from the first nozzle assembly by a first distance and is spaced apart from the catalyst outlet by a second distance, and
the first distance is set to a product of a flow velocity of the coked catalyst and a time at which the coked catalyst and the high-temperature syngas are mixed with each other.

2. The catalyst regenerator of claim 1, wherein:
the container sets a coking volume depending on the first distance, and
the coking volume is set to a size at which the coked catalyst is additionally coked by the syngas.

3. The catalyst regenerator of claim 1, wherein:
the second distance is set to a product of a flow velocity of an additionally coked catalyst and a time at which the additionally coked catalyst is combusted by the syngas.

4. The catalyst regenerator of claim 3, wherein:
the container sets a combustion volume depending on the second distance, and
the combustion volume is set to a size at which the additionally coked catalyst is combusted by the high-temperature air.

5. The catalyst regenerator of claim 1, wherein:
the first nozzle assembly includes:
a first doughnut pipe corresponding to a horizontal cross-sectional shape of a cylinder of the container; and
a first supply pipe installed in the container and connected to the first doughnut pipe to supply the syngas, and the first doughnut pipe includes a first mixed gas nozzle and a second mixed gas nozzle forming spraying directions at angles set to be 90° or less with respect to a base line penetrating through a center in a vertical direction in a circular cross section of the first doughnut pipe in the vertical direction.

6. The catalyst regenerator of claim 1, wherein:
the second nozzle assembly includes:
   a second doughnut pipe corresponding to a horizontal cross-sectional shape of a cylinder of the container; and
   a second supply pipe installed in the container and connected to the second doughnut pipe to supply the high-temperature air, and
the second doughnut pipe includes a first air nozzle and a second air nozzle forming spraying directions at angles set to be 90° or less with respect to a base line penetrating through a center in a vertical direction in a circular cross section of the second doughnut pipe in the vertical direction.

7. The catalyst regenerator of claim 1, wherein:
at least one of the first supply unit and the second supply unit includes a supply pipe connected to one side of an outer circumference of the container.

8. The catalyst regenerator of claim 1, wherein:
at least one of the first supply unit and the second supply unit includes:
   a supply chamber formed along an outer circumference of the container at the outer circumference and connected to a supply port formed in the container; and
   a supply pipe externally connected to the supply chamber.

9. A fluid catalytic cracking reaction system comprising:
a reacting unit generating a cracking reaction by mixing a catalyst with petroleum or naphtha;
a separating unit separating a reaction product generated in the reacting unit from the catalyst depending on a property and a feature; and
the catalyst regenerator of claim 1 regenerating the coked catalyst introduced from the separating unit and supplying the regenerated catalyst to the reacting unit.

10. A catalyst regeneration method using the catalyst regenerator of claim 1, comprising:
a catalyst supplying step of supplying the coked catalyst to the catalyst regenerator;
an additional coking step of additionally coking the coked catalyst by a high-temperature syngas;
a regenerating step of regenerating the additionally coked catalyst; and
a discharging step of discharging the regenerated catalyst from the catalyst regenerator.

11. The catalyst regeneration method of claim 10, wherein:
in the additional coking step, the high-temperature syngas containing solid carbon is supplied to the coked catalyst to additionally coke the coked catalyst.

12. The catalyst regeneration method of claim 10, wherein:
in the regenerating step, high-temperature air is supplied to regenerate the additional coked catalyst.

13. The catalyst regeneration method of claim 10, wherein:
the coked catalyst supplied in the catalyst supplying step passes through the additional coking step, the regenerating step, and the discharging step while moving from an upper portion of a container to a lower portion of the container.

14. A catalyst regenerator comprising:
a container including a catalyst inlet through which a coked catalyst is introduced and a catalyst outlet to which a regenerated catalyst is discharged;
a first supply unit formed below the catalyst inlet and supplying a syngas containing solid carbon to the coked catalyst introduced into the container; and
a second supply unit formed below the first supply unit and supplying high-temperature air into the container, wherein
the first supply unit is connected to a plasma burner forming a rotation arc to produce the syngas by a partial oxidation reaction.

15. A catalyst regenerator comprising:
a container including a catalyst inlet through which a coked catalyst is introduced and a catalyst outlet to which a regenerated catalyst is discharged;
a first supply unit formed below the catalyst inlet and supplying a syngas containing solid carbon to the coked catalyst introduced into the container; and
a second supply unit formed below the first supply unit and supplying high-temperature air into the container, wherein
the catalyst inlet is disposed at an upper portion of the container,
the catalyst outlet is disposed at a side portion of the container,
the catalyst inlet includes a plurality of catalyst pipes disposed to be elongated downward in the container and guiding the introduction of the coked catalyst, and
the catalyst outlet is formed at a position higher than a lower end of the catalyst pipe.

16. The catalyst regenerator of claim 15, wherein:
the first supply unit is formed at the side portion of the container at a position lower than the lower end of the catalyst pipe, and
the second supply unit is formed at a lower portion of the container at a position lower than the first supply unit.

17. A fluid catalytic cracking reaction system comprising:
a reacting unit generating a cracking reaction by mixing a catalyst with petroleum or naphtha;
a separating unit separating a reaction product generated in the reacting unit from the catalyst depending on a property and a feature; and
the catalyst regenerator of claim 15 regenerating the coked catalyst introduced from the separating unit and supplying the regenerated catalyst to the reacting unit.

18. A catalyst regeneration method using the catalyst regenerator of claim 15, comprising:
a catalyst supplying step of supplying the coked catalyst to the catalyst regenerator;
an additional coking step of additionally coking the coked catalyst by a high-temperature syngas;
a regenerating step of regenerating the additionally coked catalyst; and
a discharging step of discharging the regenerated catalyst from the catalyst regenerator.

19. The catalyst regeneration method of claim 18, wherein:
in the additional coking step, the high-temperature syngas containing solid carbon is supplied to the coked catalyst to additionally coke the coked catalyst.

20. The catalyst regeneration method of claim 18, wherein:

in the regenerating step, high-temperature air is supplied to regenerate the additional coked catalyst.

21. The catalyst regeneration method of claim 18, wherein:

the coked catalyst supplied in the catalyst supplying step passes through the additional coking step, the regenerating step, and the discharging step while moving from an upper portion of a container to a lower portion of the container.

* * * * *